United States Patent [19]

Morrison et al.

[11] Patent Number: 4,811,091

[45] Date of Patent: Mar. 7, 1989

[54] MULTI-DIRECTIONAL MOBILE INSPECTION SYSTEM

[75] Inventors: Paul E. Morrison, Levelgreen; George H. Stout, New Alexandria; George F. Dailey, Plum Boro; Mark W. Fischer, Penn Hills, all of Pa.

[73] Assignee: Westinghouse Electric Corp., Pittsburgh, Pa.

[21] Appl. No.: 92,789

[22] Filed: Sep. 2, 1987

[51] Int. Cl.⁴ ............................................. H04N 7/18
[52] U.S. Cl. .................................. 358/100; 358/107; 358/108; 356/427
[58] Field of Search ...................... 358/100, 107, 108; 356/73, 427, 92

[56] References Cited

U.S. PATENT DOCUMENTS

| 4,139,822 | 2/1979 | Urich et al. | 324/219 |
| 4,172,524 | 10/1979 | Holm et al. | 358/81 |
| 4,272,781 | 6/1981 | Taguchi et al. | 358/100 |
| 4,368,642 | 1/1983 | Carodiskey | 73/623 |
| 4,502,331 | 3/1985 | Singh et al. | 73/627 |
| 4,629,984 | 12/1986 | Scalese | 324/228 |
| 4,651,558 | 3/1987 | Martin et al. | 358/100 |

FOREIGN PATENT DOCUMENTS 2492527  4/1982  France .
627393  8/1978  U.S.S.R. .

OTHER PUBLICATIONS

Paper presented at EPRI Conference, Sep. 1986, San Antonio, Texas, entitled "Remote Inspection of Steam Turbine Blades".
Page 32 of the Feb. 12, 1987 edition of Machine Design Magazine showing an "Autonomous Mibile Robot".
Picture of a device identified as a Model RM-180 manufactured by Assistance Industrielle Dauphinoise of France.

Primary Examiner—James J. Groody
Assistant Examiner—John K. Peng

[57] ABSTRACT

Apparatus for performing inspections in difficult to access locations. The device includes remotely controlled transport apparatus upon which is mounted a camera and illumination lamps. The transport apparatus is maneuvered, through the remote control system, to the location where a visual inspection is to be performed. The associated camera then transmits a picture of the area in the vicinity of the camera back to a remote television monitor where it may be viewed.

12 Claims, 8 Drawing Sheets

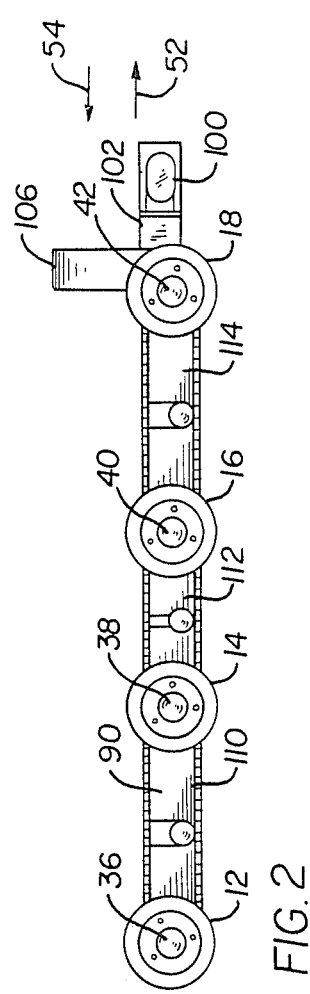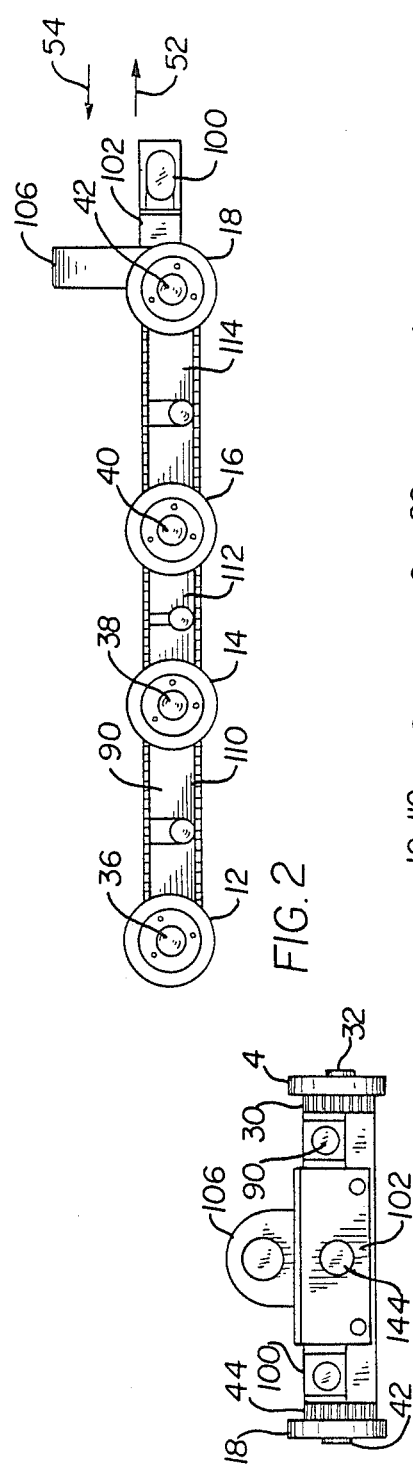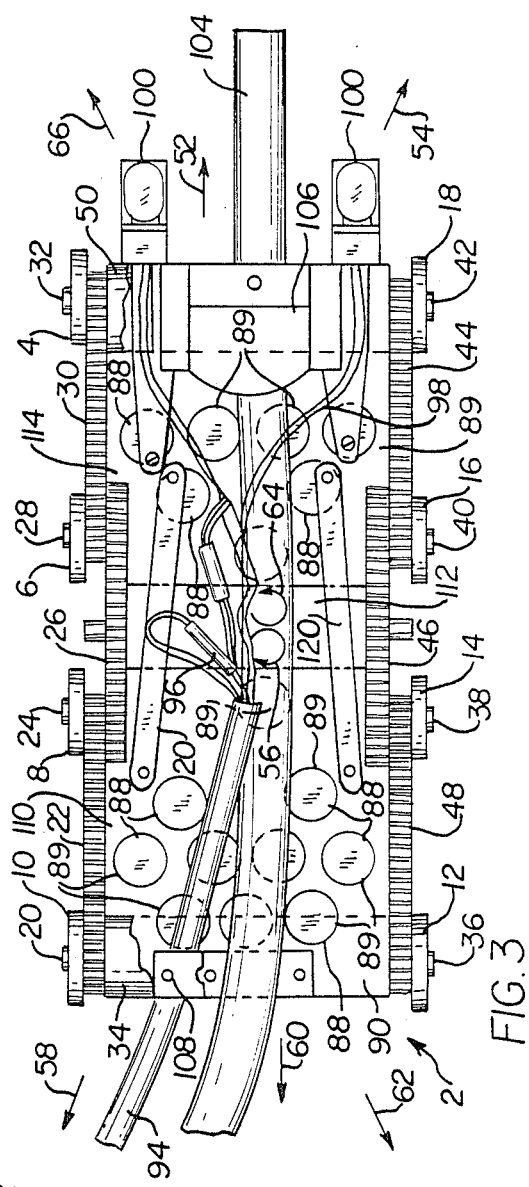
FIG. 1
FIG. 2
FIG. 3

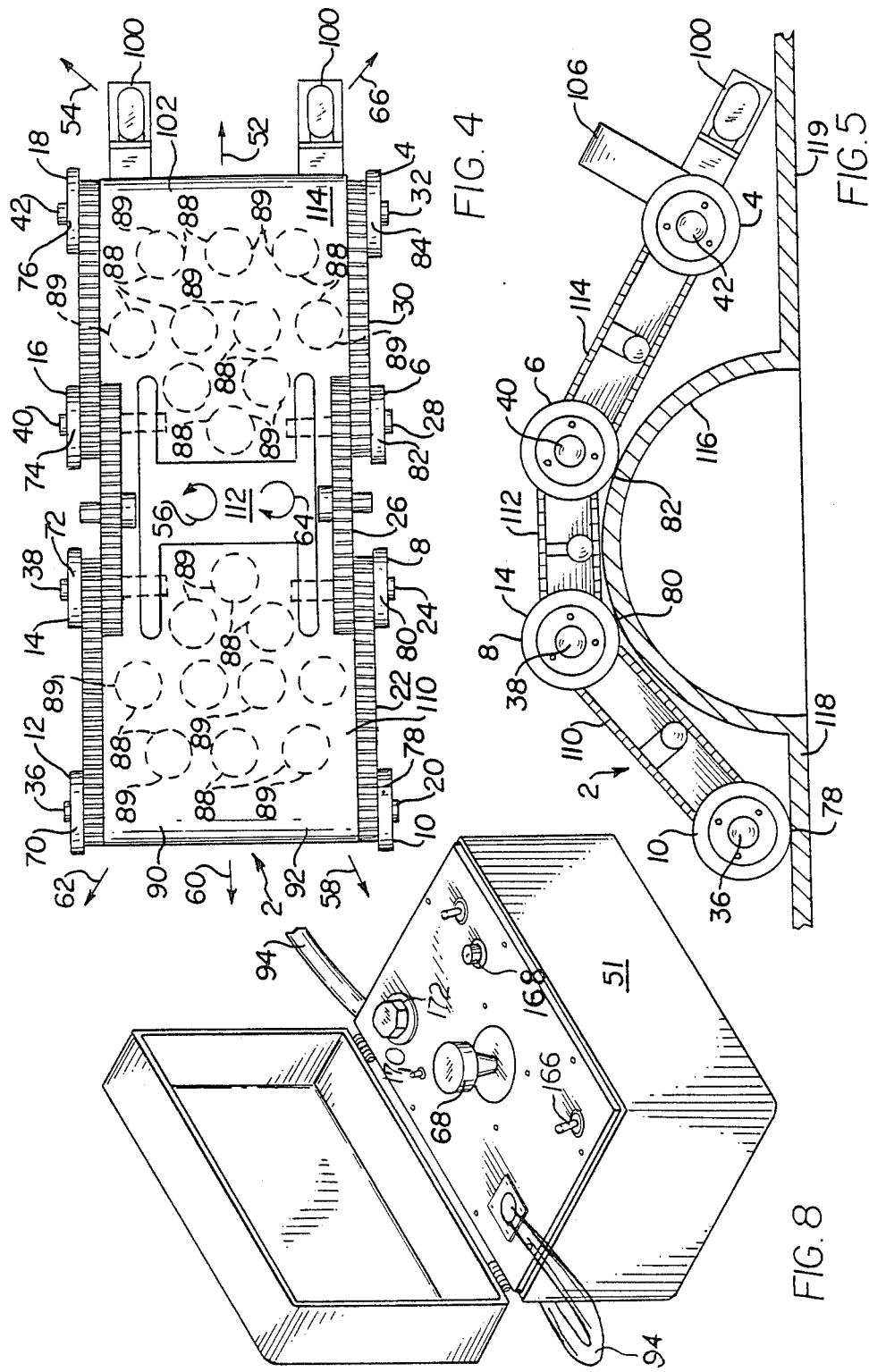

| DIRECTION OF MOVEMENT OF SYSTEM 2 | CONTROL STICK 68 POSITION | DIRECTION OF MOVEMENT OF CONTACT SURFACES 78,80,82,84 | DIRECTION OF MOVEMENT OF CONTACT SURFACES 70,72,74,76 |
|---|---|---|---|
| 52 |  | 52 | 52 |
| 54 |  | 52 | STOP |
| 56 |  | 52 | 60 |
| 58 |  | STOP | 60 |
| 60 |  | 60 | 60 |
| 62 |  | 60 | STOP |
| 64 |  | 60 | 52 |
| 66 |  | STOP | 52 |
FIG. 6

MULTI-DIRECTIONAL MOBILE INSPECTION SYSTEM

BACKGROUND OF THE INVENTION

1. Field of the Invention

The present invention pertains to a multi-directional mobile inspection system which may be used in a variety of applications including the inspection of turbine generator ("TG") stator baffle ducts.

2. Background Information

Frequently, it is necessary to perform visual and non-visual inspections in locations which are difficult, if not impossible, to access without disassembly of the apparatus which is being inspected. Under such conditions the cost, or complexity of apparatus disassembly, frequently limits the number of important inspections which are performed. One such area where inspection is difficult to perform is within TG stator ducts.

The TG stator ducts are located at the outside diameter of the stator bore and are tangentially disposed around the perimeter of the bore The cross-sectional area of each duct varies around the perimeter but at some points, the cross-section is only two inches in radial depth and ten inches in axial width. Length can be up to one-half the perimeter of the stator. Approximately a dozen ducts are located at equal spacing along the core. Their function is to introduce cold gas to, and remove hot gas from the hot and cold gas zones in the generator and there are up to seven zones in the generator.

Recently, several of these baffle ducts have failed causing a portion of the duct to fragment Such fragments frequently are blown across adjacent parallel rings causing rapid magnetic heating of the failed baffle duct fragment Such heating of the fragment then melts the electrical insulation of the rings which are in contact with the fragment causing two of the generator phases to fault The present method of inspecting baffle ducts is to perform a visual inspection of the accessible areas using a flashlight and mirror. This results in an inspection of only about ten percent of the duct The other ninety percent of the duct area is not inspected.

Accordingly, there exists a need for an inspection system for TG stator baffle ducts, and other hard to access apparatus, that can access a greater portion of a baffle duct.

SUMMARY OF THE INVENTION

The present invention provides a multi-directional mobile inspection system which includes transport apparatus which is adapted for multi-directional movement along a surface, control apparatus in communication with the transport apparatus for controlling the movement of the transport apparatus, inspection apparatus mounted on the transport apparatus and magnets, attached to the transport apparatus, for movably securing the transport apparatus to the surface.

Also provided is a turbine generator stator baffle duct inspection system which includes transport apparatus which is adapted for multi-directional movement along the baffle duct, control apparatus in communication with the transport apparatus for controlling the movement of the transport apparatus, electrical generator inspection apparatus mounted on the transport apparatus and magnets attached to the transport apparatus for movably securing the transport apparatus to the baffle duct.

BRIEF DESCRIPTION OF THE DRAWINGS

The invention may be better understood, and further advantages and uses thereof are readily apparent, when considered in view of the following detailed description of exemplary embodiments, taken with the accompanying drawings in which:

FIG. 1 is a front elevational view of the mobile inspection system constructed in accordance with the provisions of the present invention;

FIG. 2 is a side elevational view of the apparatus of the present invention;

FIG. 3 is a top view of the apparatus of the present invention;

FIG. 4 is a bottom view of the apparatus of the present invention;

FIG. 5 is a side elevational view of the apparatus of the present invention shown maneuvering over a curved surface;

FIG. 6 is a table showing the relationship between control stick position and the direction of travel of the present invention;

FIG. 8 is a perspective view of the control box of the present invention; and

DETAILED DESCRIPTION OF THE PREFERRED EMBODIMENT

Figure 7:
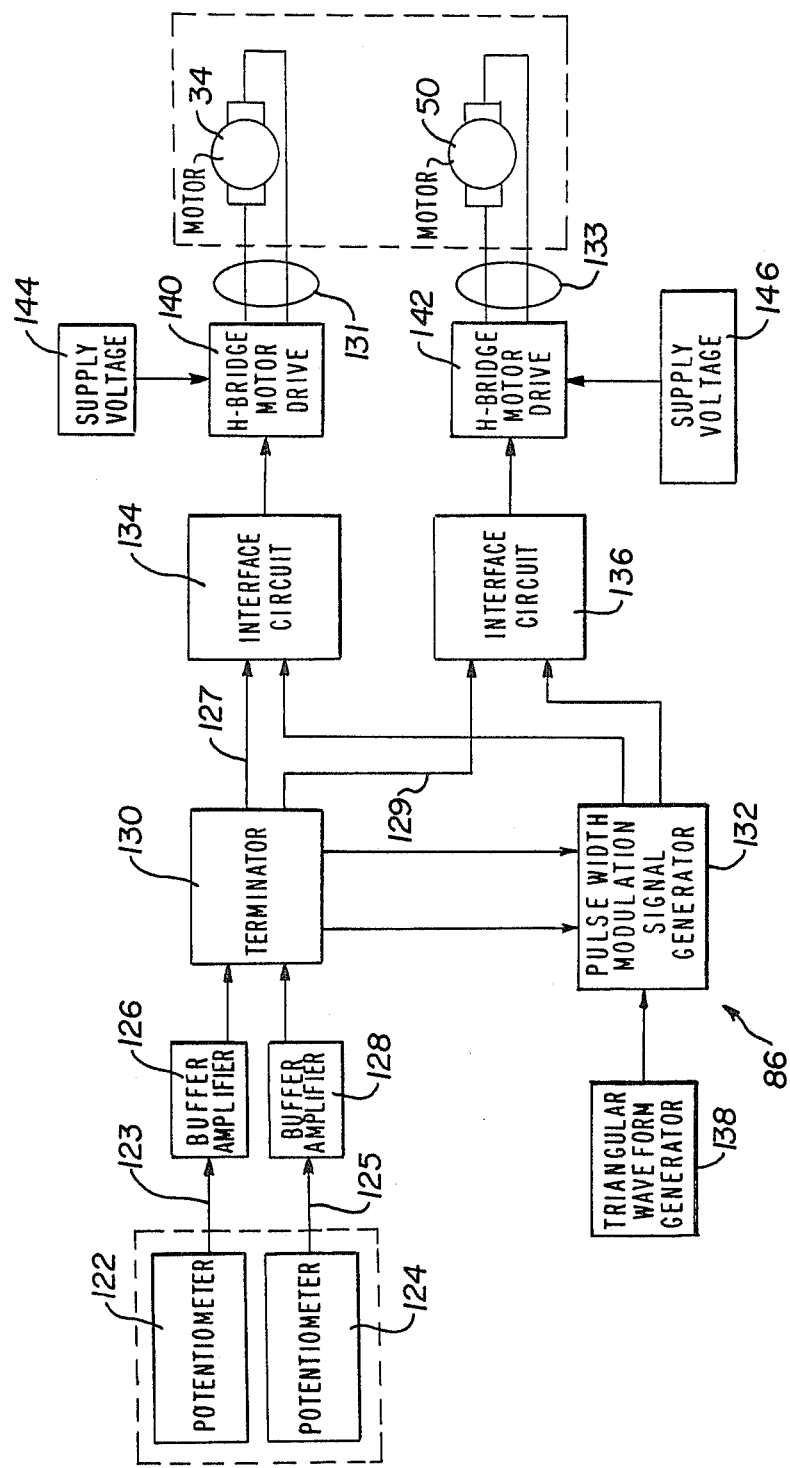
FIG. 7 is a block diagram of the control system of the present invention.
Figure 9A:
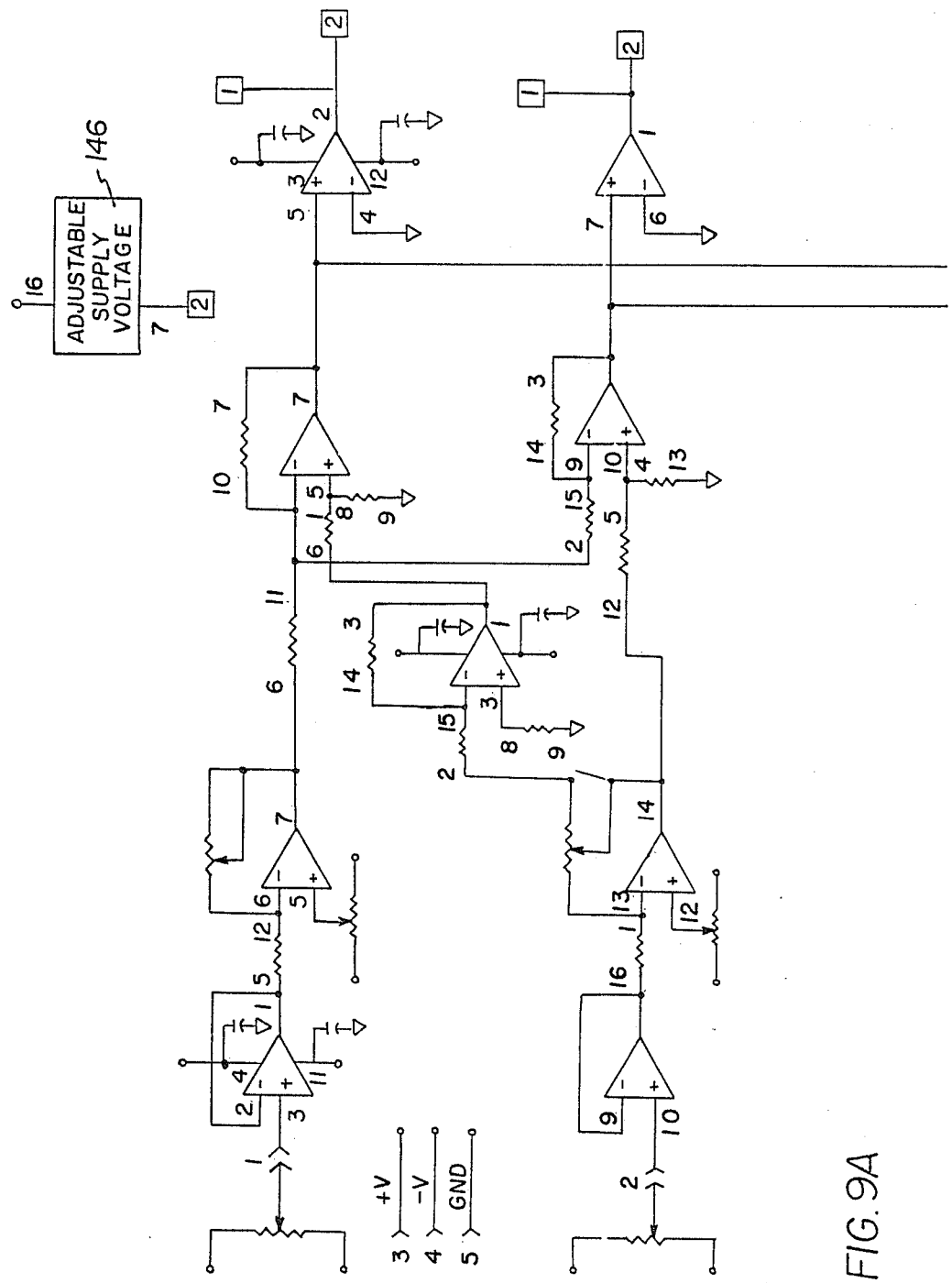
FIGS. 9a, 9b, 10a and 10b are schematic diagrams of the control system of the present invention.
Figure 9B:
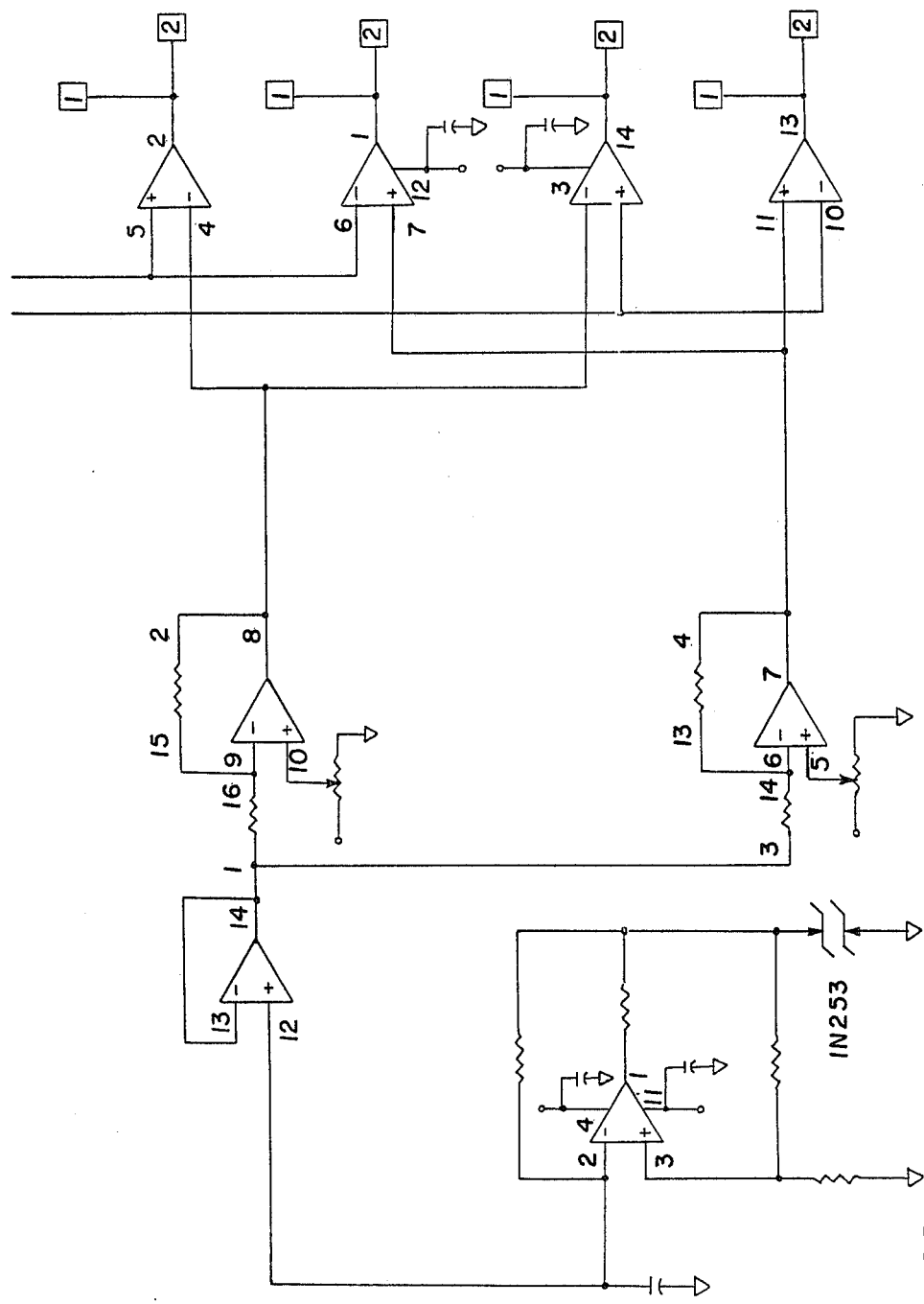

FIGS. 1 through 5 depict the preferred embodiment of the present invention. Inspection system 2 includes wheels 4, 6, 8, 10, 12, 14, 16 and 18. Axle 20 is rigidly attached to wheel 10 so that when axle 20 rotates, wheel 10 rotates at an equal angular velocity. Chain 22 which is preferably sold by Winfred M. Berg of East Rockaway, N.J. as "FLEX-E-GEAR" Model No. 24 GCF-50-E, is mechanically connected to the wheel 10/axle 20 assembly through a sprocket (not shown) which projects radially outwardly from axle 20. Wheel 8 and axle 24 are, likewise, mechanically connected to rotate together Axle 24 also includes a radially projecting sprocket (not shown) which is movably engaged with chains 22 and 26. Similarly, axle 28 includes a radially projecting sprocket (not shown) which engages chains 26 and 30. Also, wheel 6 and axle 28 are mechanically connected to rotate together Additionally, axle 32 includes a radially projecting sprocket (not shown) which engages chain 30. Finally, wheel 4 and axle 32 are mechanically connected to rotate simultaneously.

Motor 34, which is preferably a planetary gear DC permanent magnet motor manufactured by TRW Motor Division of Dayton, Ohio, rotates axle 20. This, in turn, causes wheel 10 to rotate which, in turn, causes chain 22 to rotate on axle 24. A sprocket (not shown) on axle 24, likewise, rotates wheel 8 and moves chain 26. Chain 26, in a similar manner, rotates on axle 28 which, in turn, rotates wheel 6 and moves chain 30. Finally, chain 30 rotates on axle 32 which, in turn, rotates wheel 4. Thus, the rotation of motor 34 causes all of wheels 4, 6, 8 and 10 to rotate simultaneously.

In a similar arrangement, wheels 12, 14, 16 and 18 are mechanically attached to sprockets (not shown) on axles 36, 38, 40 and 42, respectively, so that each wheel rotates on its associated axle. Also, each of axles 36, 38, 40 and 42 include radially projecting sprockets (not shown) for engaging associated chains 44, 46 and 48 which are shown in FIGS. 1–5. Therefore, the rotation of axle 42 causes wheel 18 to rotate and chain 44 to rotate on axle 40. That in turn causes chain 46 to rotate on axle 38 which, in turn, causes chain 48 to rotate on axle 12. Such rotation of axle 42, therefore, causes each of wheels 12, 14 and 16, to rotate on axles 36, 38 and 40, respectively, at the same angular speed as wheel 18. Motor 50 is mechanically connected to rotate axle 42. Therefore, the rotation of motor 50 causes each of wheels 12, 14, 16 and 18 to rotate simultaneously. This motor, axle, chain and wheel arrangement allows inspection system 2 to be propelled in a variety of directions.

Movement of inspection system 2 is controlled by control box 51 as shown in FIG. 8. The various directions which inspection system 2 may be propelled are shown in FIGS. 3 and 4 by directional arrows 52, 54, 56, 58, 60, 62, 64 and 66. For purposes of clarity, those portions of wheels 4, 6, 8, 10, 12, 14, 16 and 18 which, at any given moment, are in contact with the surface or surfaces over which inspection device 2 is traveling will be identified as the "contact surfaces" of these wheels. As each wheel turns, its contact surface moves linearly, in the direction of either arrow 52 or 60, with respect to the surface over which inspection system 2 travels.

When it is desired that inspection system 2 move in the direction of arrow 52, control stick 68 is positioned as shown in FIG. 6. Control circuit 86 activates motors 34 and 50 causing contact surfaces 70, 72, 74, 76, 78, 80, 82 and 84 of wheels 12, 14, 16, 18, 10, 8, 6 and 4 respectively to move in the direction of arrow 52.

When it is desired that inspection system 2 move in the direction of arrow 54, control stick 68 is positioned as shown in FIG. 6 causing motor 34 to be activated That, in turn, causes contact surfaces 78, 80, 82 and 84 of wheels 10, 8, 6 and 4, respectively, to move in the direction of arrow 52 Motor 50 remains stopped.

When it is desired that inspection system 2 rotate about its center in the direction of arrow 56, control stick 68 is positioned as shown in FIG. 6 causing motor 34 to move contact surfaces 78, 80, 82 and 84 of wheels 10, 8, 6 and 4, respectively, in the direction of arrow 52 while motor 50 causes contact surfaces 70, 72, 74 and 76 of wheels 12, 14, 16 and 18, respectively, to move in the direction of arrow 60.

When it is desired that inspection system 2 move in the direction of arrow 58, control stick 68 is positioned as shown in FIG. 6 causing motor 34 to be stopped and causing motor 50 to move contact surfaces 70, 72, 74 and 76 of wheels 12, 14, 16 and 18 in the direction of arrow 60.

When it is desired that inspection system 2 move in the direction of arrow 60, control stick 68 is positioned as shown in FIG. 6 causing motors 34 and 50 to move contact surfaces 78, 80, 82, 84, 70, 72, 74 and 76 of wheels 10, 8, 6, 4, 12, 14, 16 and 18, respectively, in the direction of arrow 60.

When it is desired that inspection system 2 move in the direction of arrow 62, control stick 68 as positioned in FIG. 6 causing motor 50 to be stopped and causing motor 34 to move contact surfaces 78, 80, 82 and 84 of wheels 10, 8, 6 and 4 in the direction of arrow 60.

When it is desired that inspection system 2 rotate about its center in the direction of arrow 64, control stick 68 has positioned in FIG. 6 which causes motor 34 to move contact surfaces 78, 80, 82, and 84 of wheels 10, 8, 6 and 4 respectively in the direction of arrow 60 while motor 50 causes contact surfaces 70, 72, 74 and 76 of wheels 12, 14, 16 and 18, respectively, to move in the direction of arrow 52.

Finally when it is desired that inspection system 2 move in the direction of arrow 66, control stick 68 as positioned in FIG. 6 causing motor 34 to be stopped and motor 50 to move contact surfaces of 70, 72, 74 and 76 of wheels 12, 14, 16 and 18, respectively, in the direction of arrow 52. When it is desired that inspection system 2 be stopped, control stick 68 is positioned in its central position as shown in FIG. 8 causing motors 34 and 50 to be stopped.

In all of the described examples, when motors 34 and 50 are both turning, they are moving at preferably the same speed. However, if control stick 68 is positioned in any position, other than its central position, which is intermediate to those shown in FIG. 6, the relative speeds of motors 34 and 50 will be altered causing the direction of inspection system 2 to assume a direction intermediate to those shown in FIG. 3.

As shown in FIGS. 3 and 4, a plurality of magnets 88 are positioned within frame 90 of inspection system 2 Frame 90 is formed by machining a solid piece of nylon. In the preferred embodiment of the invention, twenty recesses 89, in the form of cylindrical openings, are formed in frame 90. The twenty magnets 88 are positioned within recesses 89. The magnets are neodymium magnets preferably manufactured by Bunting Magnetics of Newton, Kansas.

Magnets 88 are all positioned within frame 90 such that they rest against bottom 92. Bottom 92 separates magnets 88 from the apparatus upon which inspection device 2 is positioned by approximately 0.09 inches. Additionally, all of the poles of magnet 88 face in the same direction. This allows magnets 88 to generate an attraction force of approximately twenty pounds when bottom 92 of inspection system 2 is positioned on a sheet of steel. The number and position of magnets 88 may be altered to adjust the attraction force for specific applications.

Control conduit 94, which is held in position by bracket 108, extends between inspection system 2 and control box 51 and contains electrical conductors 96 for controlling motors 34 and 50 and electrical conductors 98 which supply electrical power to lamps 100. Lamps 100 illuminate the area in the vicinity of front end 102 of inspection system 2. Camera 104 is positioned on front end 102 of inspection system 2 and is held in place by bracket 106. Camera 104 is, preferably, a model 2000 Video Probe camera manufactured by Welsh-Allyn. Camera 104 is connected to a color television monitor (not shown) which is positioned nearby the operator of inspection system 2. This permits the operator to view the area in the vicinity of front end 102. Other cameras, such as a Sony Model No. HUM-302, may be used in place of the Welsh-Allyn camera. The Welsh-Allyn camera is sold as a package with an associated television monitor and conductor cable which electrically connects the camera and television. The use and operation of camera 104 are well known to those skilled in the art.

As shown in FIGS. 2, 3, 4 and 5, frame 90 comprises 3 pivotally connected sections 110, 112 and 114. Extending between sections 112 and 114 are axles 28 and 40. Also, extending between sections 112 and 110 are axles 24 and 38. This pivotal connection arrangement allows sections 110 and 112 to relatively pivot, as shown in FIG. 5, around axles 24 and 58 and sections 112 and 114 to relatively pivot around axles 28 and 40. Such an arrangement allows inspection system 2 to articulate over obstructions, such as curved surface 116, as shown in FIG. 5.

FIG. 5 shows inspection system 2 maneuvering over curved surface 116. Due to the pivotally connected arrangement of sections 110, 112 and 114, inspection system 2 can articulate over curved surface 116 with wheels 10, 8, 6, 12, 14 and 16 in contact with curved surface 116 and flat surface 118. Although wheels 4 and 18 are not in contact with any surface, inspection system 2 can still be propelled by the motion of wheels 10, 8, 6, 12, 14 and 16. Although not shown, inspection system 2 is flexible enough to articulate around a bend with an exterior angle as large as 270 degrees. Leaf springs 120 bias the relative bending between Sections 110, 112 and 114 to most suitably conform to the shape of the surface over which inspection system 2 is traveling.

FIG. 7 shows the block diagram of control circuit 26 of inspection system 2. Control stick 68 of control box 51 (FIG. 8) is mechanically connected to forward-/reverse control potentiometer 122 and left/right control potentiometer 124. Movement of control stick 68 alters the resistive value of potentiometers 122 and 124. Potentiometers 122 and 124 are biased by +12 volts D.C. and −12 volts D.C. so that a variable D.C. output voltage appears on conductors 123 and 125. The value of the voltage on conductors 123 and 125 varies within the range of +12 volts D.C., depending on the position of control stick 68. The voltage signals on conductors 123 and 125 are fed into buffers and amplifiers 126 and 128, respectively The output from buffers and amplifiers 126 and 128 is fed to motor axis speed and direction control terminator 130 which produces a direction signal on conductors 127 and 129 for motors 34 and 50.

Additionally, terminator 130 produces two signals that control the speed for motors 34 and 50. These speed signals are in analog form and are fed into pulse width modulation signal generator 132 where they are converted into a pulse width modulated form which is suitable to control the speeds of motors 34 and 50. Triangular wave form generator 138 is used to provide the frequency of the pulse width modulated signal The width of the pulse is determined by the analog voltage level from buffers and amplifiers 126 and 128 The direction and speed signals are then fed into logic and interface circuits 134 and 136 which, in turn, control H-bridge motor drives 140 and 142, respectively Motor drives 140 and 142 each have adjustable supply voltages 144 and 146, respectively, that are used to help compensate for different gearing in motors 34 and 50 so that they run more evenly. Motor drives 140 and 142 control motors 34 and 50, respectively, through cables 131 and 133, respectively The entire control circuitry, with the exception of cables 131 and 133 and motors 34 and 50 are housed in control box 121, as shown in FIG. 8.

FIG. 8 shows control box 51 Control stick 68 controls the movement of inspection system 2 Disable switch 155 provides and cuts off electrical power to control system 86. An indication that power is provided to control system 86 is provided by power light 168 Also, illumination switch turns lamps 100 on and off while illumination level control 172 controls the intensity of light from lamps 100.

The schematic for the circuits of FIG. 7 are shown in FIGS. 9a, 9b, 10a and 10b. The circuit shown in FIG. 9a includes pull-up resistor pack 46 which is, preferably, manufactured by Bourns as model no. 4116R-002-332.

Figure 10A:
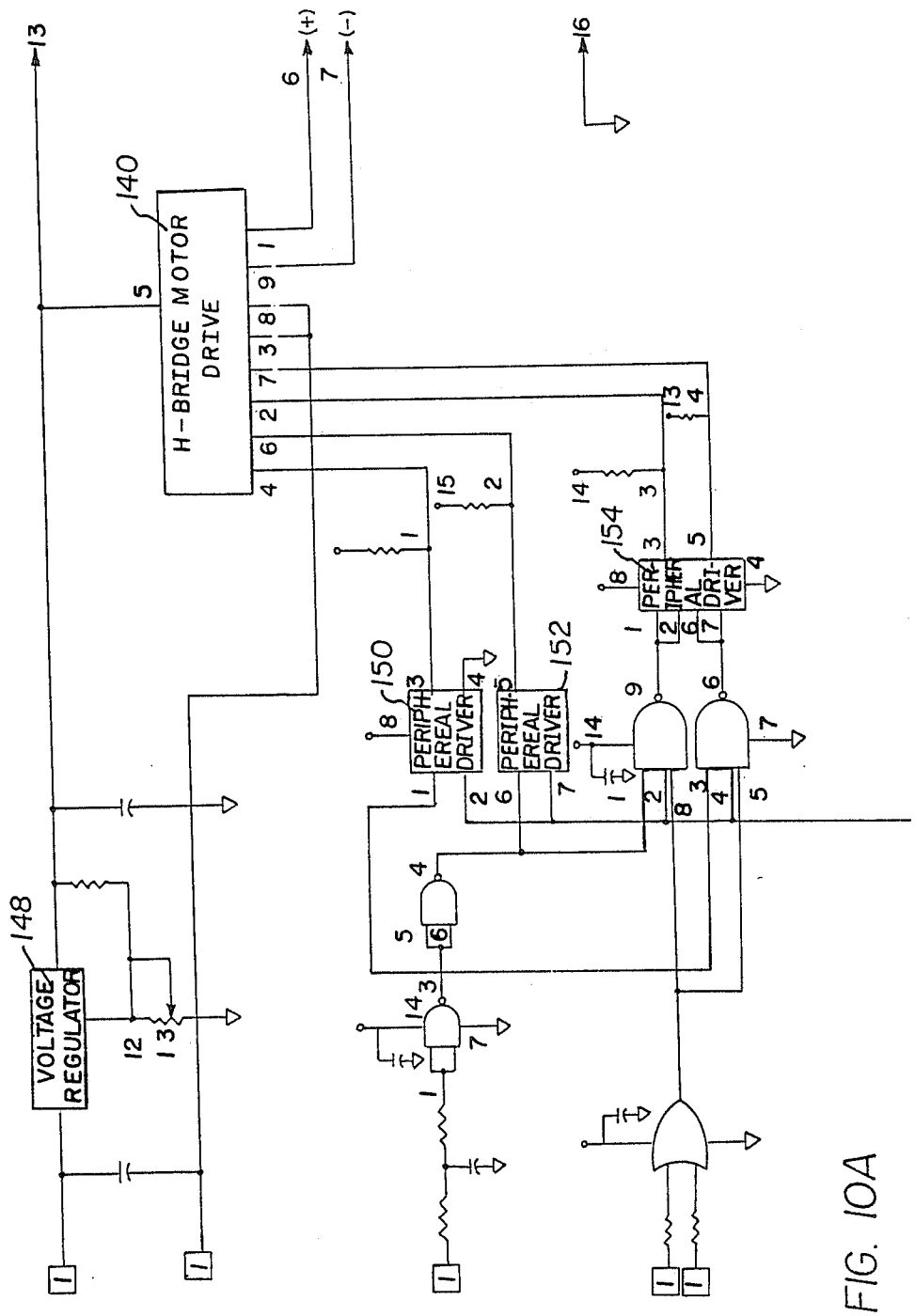
Figure 10B:
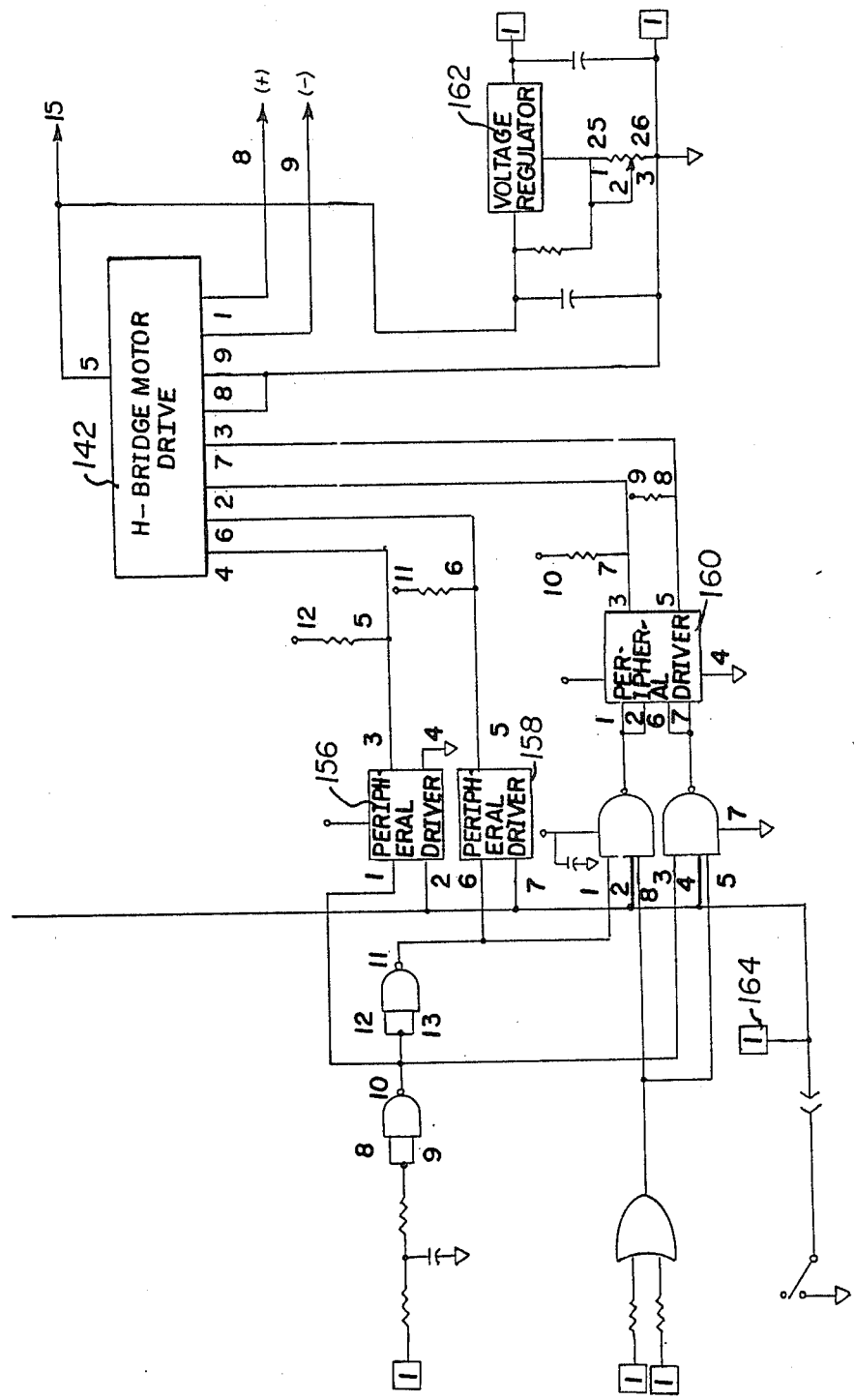

In FIGS. 10a and 10b voltage regulators 148 and 162, which are, preferably, manufactured by Motorola as model no. LM 317, are provided. Also shown are H-Bridge motor drive 140 and 142, which are, preferably, manufactured by International Rectifier as model no. IRFT003. Additionally, peripheral driver 150, 152, 154, 156, 158 and 160, which are preferably manufactured by National Semi-Conductor as model no. DS3631, are shown.

The remaining components shown in FIGS. 9a, 9b, 9c and 9d are standard components which are well known to those skilled in the art.

In use, inspection system 2 is positioned on the surface over which it will travel. Preferably, this surface is made of a ferrous material so that magnets 88 will moveably secure inspection system 2 to the surface. Due to the positioning and number of magnets 88, inspection system 2 may be positioned to hang from vertical surfaces or from the bottom of horizontal surfaces without the risk of falling. Lights 100 may be illuminated if inspection system 2 is to be directed into a poorly light area. The person operating the system then adjusts the position of control stick 68 causing inspection system 2 to move in the desired direction as previously described As inspection system 2 is maneuvered, camera 104 transmits a picture back to its associated television monitor (not shown). By maneuvering inspection apparatus 2 within a TG stator baffle duct the operator may monitor the television and determine whether any defects are present.

If it is discovered that small amounts of debris are located in the vicinity of inspection system 2, a magnet, adhesive or other device 144 capable of contacting and attaching to the debris may be placed on front end 102. Inspection system 2 is then maneuvered so that the magnet, adhesive or other device contacts and attaches to the debris Inspection system 2 and the attached debris may then be easily removed from the duct.

For purposes of illustration, the apparatus of the present invention has been described in conjunction with the inspection of TG stator baffle ducts It may be appreciated, though, that this apparatus has numerous applications in many other non-related fields where such a remotely controlled device would be useful.

Whereas particular embodiments of the invention have been described for purposes of illustration, it will be evident to those skilled in the art that numerous variations of the details may be made without departing from the invention as defined in the appended claims.

What is claimed is:

1. A multi-directional mobile inspection system comprising:

transport means adapted for multi-directional movement along a surface;

control means in communication with said transport means for controlling said movement of said transport means;

inspection means mounted on said transport means;

magnet means attached to said transport means for moveably securing said transport means to the surface; and separator means interposed between said magnet means and the surface for relatively positioning said magnet means out of contact with the surface.

2. The inspection system of claim 1 wherein said inspection means includes camera means.

3. The inspection system of claim 2 including illumination means attached to said transport means for illuminating in the vicinity of said transport means.

4. The inspection system of claim 1 including motor means attached to said transport means for moving said transport means along the surface.

5. The inspection system of claim 4 wherein said motor means includes at least two motors.

6. The inspection system of claim 1 wherein said inspection means includes attachment means for securing said transport means to an object in the vicinity of said transport means.

7. A turbine generator stator baffle duct inspection system comprising:
   transport means adapted for multi-directional movement along the baffle duct;
   control means in communication with said transport means for controlling said movement of said transport means;
   electrical generator inspection means mounted on said transport means;
   magnet means attached to said transport means for moveably securing said transport means to the baffle duct; and
   separator means interposed between said magnet means and the baffle duct for relatively positioning said magnet means out of contact with the baffle duct.

8. The inspection system of claim 7 wherein said inspection means includes camera means.

9. The inspection system of claim 8 wherein said transport means includes illumination means for illuminating in the vicinity of said transport means.

10. The inspection system of claim 7 wherein said transport means includes motor means for moving said transport means along the baffle duct.

11. The inspection system of claim 10 wherein said motor means includes two motors.

12. The inspection system of claim 7 wherein said inspection means includes attachment means for securing said transport means to an object in the vicinity of said transport means.

* * * * *